Figure 1:
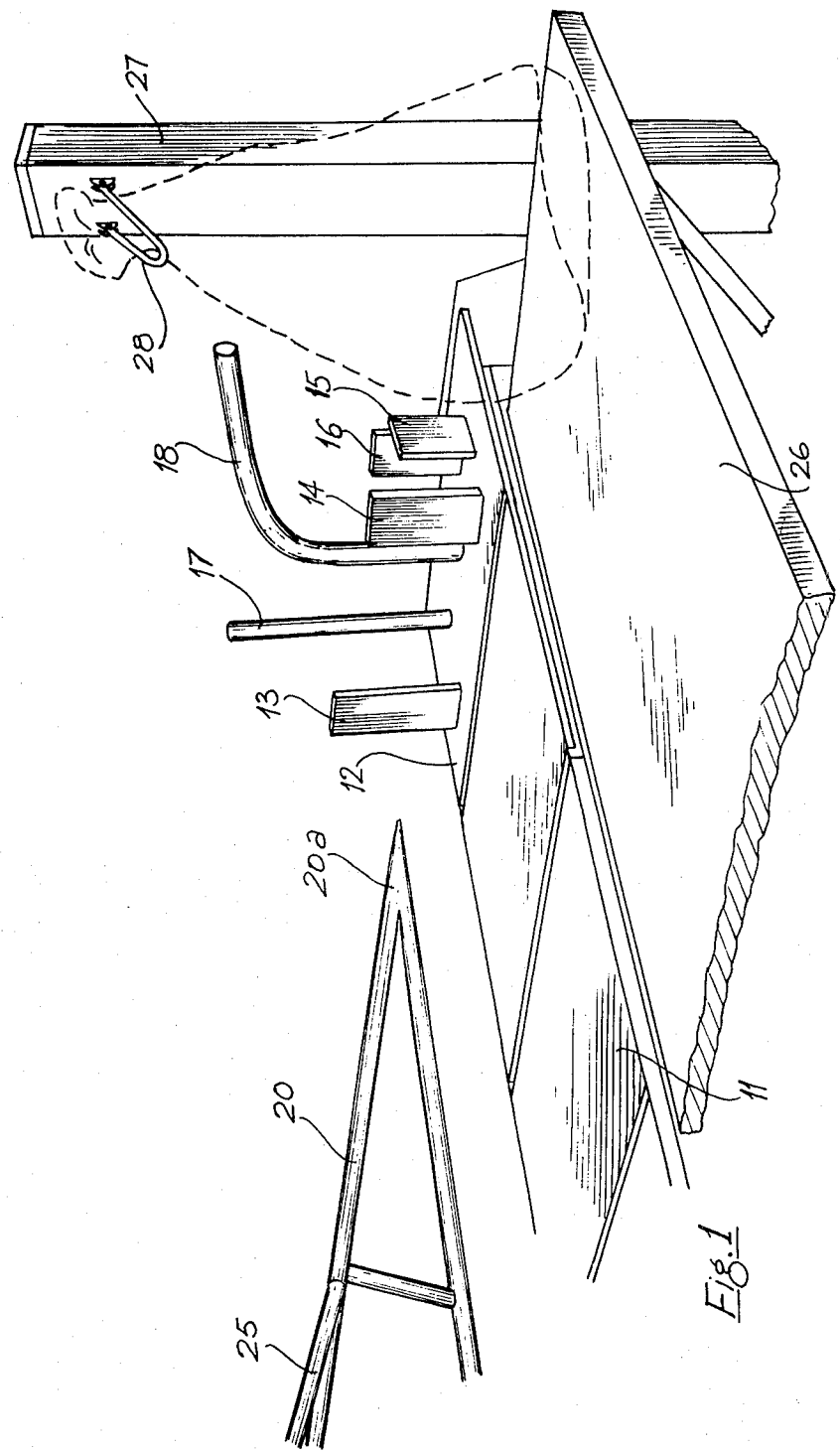

United States Patent [19]

Croasdell

[11] 4,237,580
[45] Dec. 9, 1980

[54] HALF PIG'S HEAD BONING METHOD AND APPARATUS

[76] Inventor: Desmond F. Croasdell, 115 Retreat Park, Athlone, Ireland

[21] Appl. No.: 52,894

[22] Filed: Jun. 28, 1979

[51] Int. Cl.³ ............................................. A22C 17/00
[52] U.S. Cl. ........................................ 17/45; 17/1 R
[58] Field of Search ............................ 17/1 R, 23, 45

[56] References Cited

U.S. PATENT DOCUMENTS

| | | | |
|---|---|---|---|
| 962,782 | 6/1910 | Perrigo | 17/1 R |
| 1,561,547 | 11/1925 | Karpenko | 17/1 R |
| 2,186,273 | 1/1940 | Schmidt | 17/1 R |
| 2,436,629 | 2/1948 | Carlsen | 17/1 R |
| 3,084,378 | 4/1963 | Macy et al. | 17/1 R |
| 3,982,299 | 9/1976 | Kompan | 17/1 R |

*Primary Examiner*—Willie G. Abercrombie
*Attorney, Agent, or Firm*—Sughrue, Rothwell, Mion, Zinn and Macpeak

[57] ABSTRACT

The invention concerns a method and apparatus for severing the jowl muscles of a half pig's head, in order to facilitate subsequent boning of the half head to provide bone and pig's head meat as the end product.

For this purpose, in one embodiment of the invention, the half pig's head (19) is placed on a moving conveyor (11) comprising a series of stainless steel plates (12), the half head being held securely in a predetermined position by a locating and supporting means (13 to 18) welded to the plate (12). The half head so held is presented by the conveyor to a fixed wedge member (20) pointing in the opposite direction to that of the conveyor movement, the wedge member acting to force the jaws of the half head progressively further apart to sever the jowl muscles.

Preferably, the outer skin or rind of the half head is removed before the latter is placed on the conveyor. This is achieved manually by an operative using a knife, the half head during this operation being placed on a table (26) and held in position by a wire loop (28) which holds the snout of the half head tightly against a post (27).

6 Claims, 6 Drawing Figures

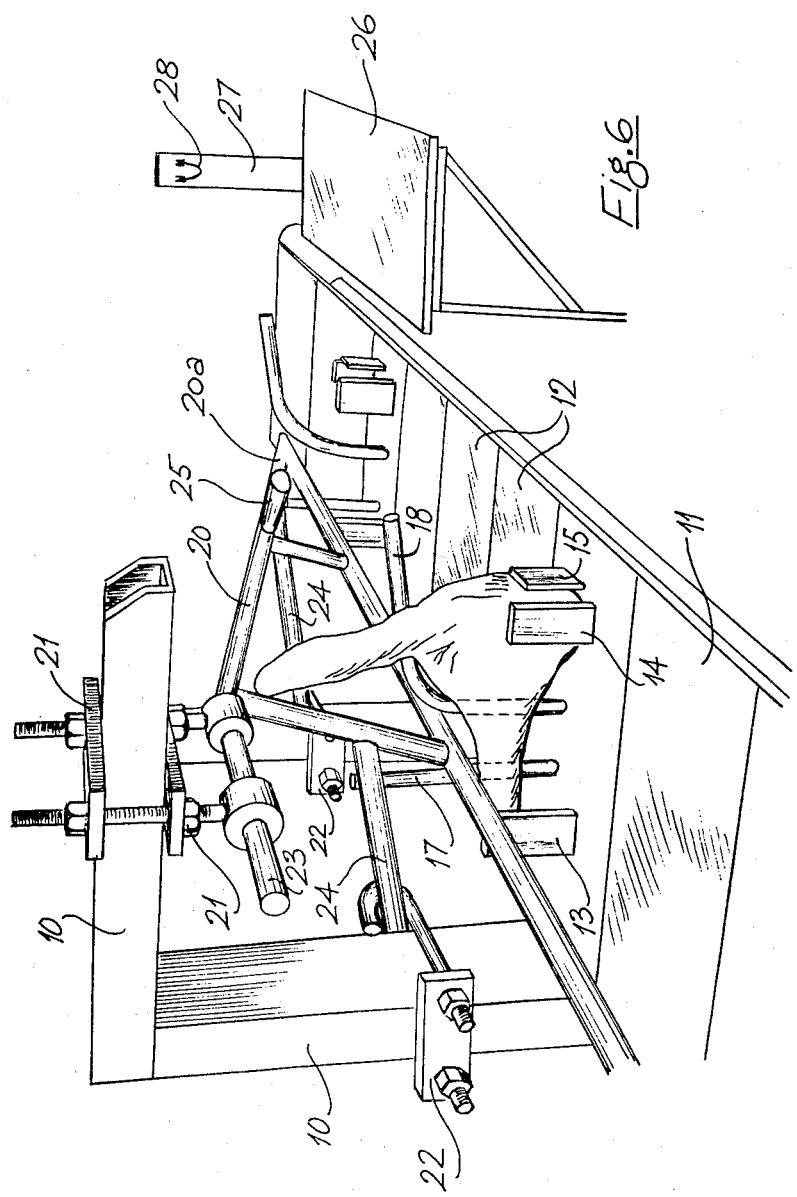

HALF PIG'S HEAD BONING METHOD AND APPARATUS

This invention relates to a method and apparatus to assist in boning half a pig's head to provide bone, rind and pig's head meat as the end product.

To comply with the strict Animal Health regulations applicable in the Bacon Industry it is necessary for the processing factory, following slaughter of the pig, to split the carcass in two halves along the spine to allow veterinary inspection of the spinal channel and to split the pig's head along a centre line into two halves to allow similar inspection of the brain. Once the inspection is completed, the carcass is processed in the normal manner.

The half pig's heads which remain are often sold off as offal since the half heads are very difficult to process efficiently and economically due to the necessity for further processing of first severing the jowl muscles. The present invention is primarily directed at providing a method and apparatus for severing the jowl muscles of a pig's head. The severing of the jowl muscles finished, the processing of the half pig's head to obtain pig's head meat and bone as separate end products is relatively easy and the income resultant on the sale of the said separated end products and the rind substantially exceeds the income on the sale of half pig's heads as offal.

The present invention provides a method of severing the jowl muscles of a half pig's head which comprises placing the half head on a moving conveyor such that the half head is held securely on the conveyor for sideways presentation to a fixed wedge member pointing in the opposite direction to that of the conveyor movement, the wedge member entering between the jaws of the half head from the side and acting to force the jaws progressively further apart to sever the jowl muscles without severing the entire jaw. Preferably the half head has the outer skin or rind removed before it is placed on the moving conveyor.

The present invention also provides an apparatus for carrying out the method described above. The said apparatus comprises an endless conveyor and a fixed wedge member located above the conveyor and pointing in the opposite direction to that of the conveyor movement, the conveyor having at least one means for locating and supporting a half pig's head sideways thereon wherein upon movement of the conveyor the fixed wedge member enters between the jaws of the half head from the side and acts to force the jaws progressively further apart to sever the jowl muscles without severing the entire jaw.

Figure 2:
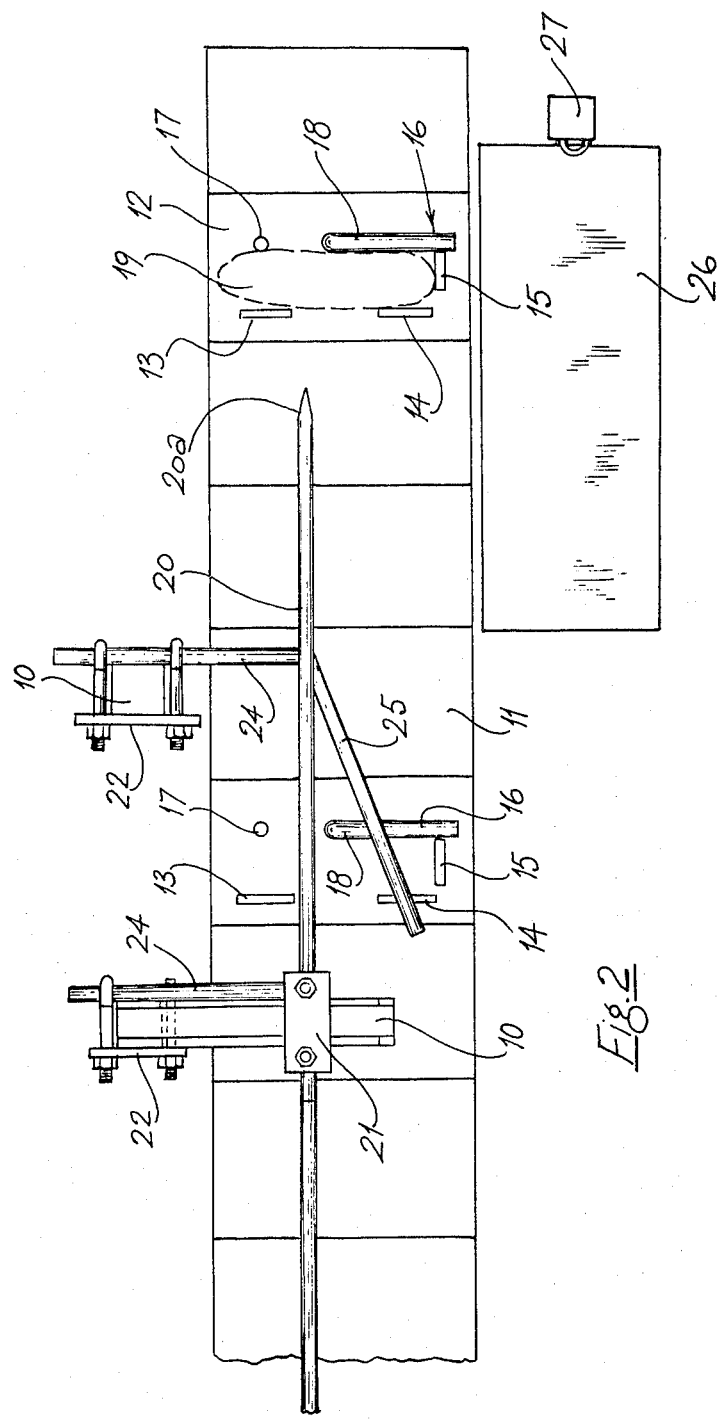
Figure 3:
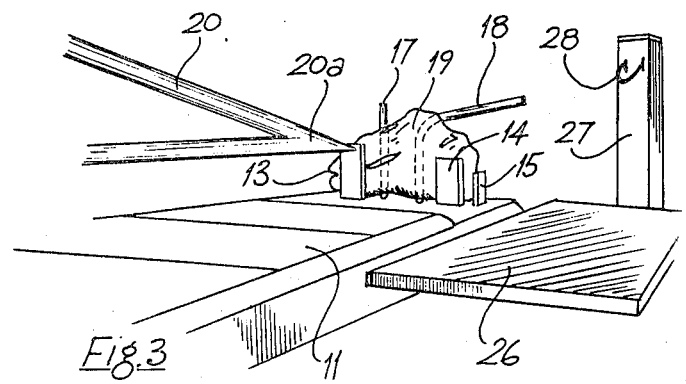
Figure 4:
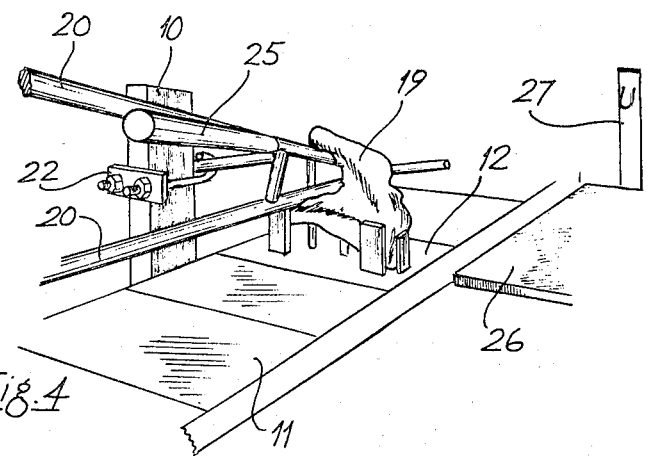
Figure 5:
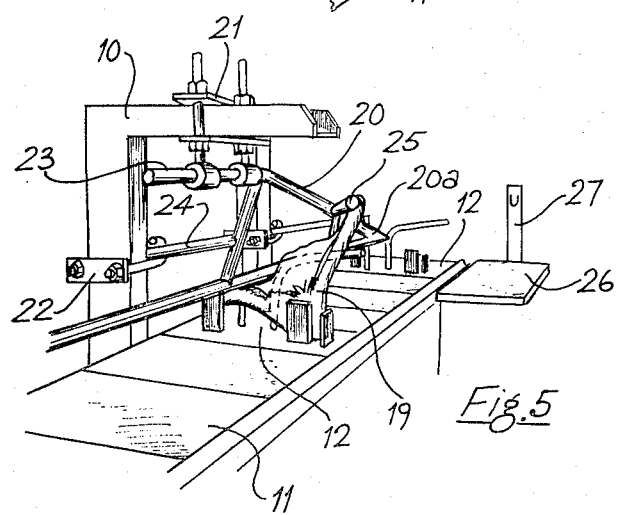

The invention will be understood from the following description of an embodiment thereof given by way of example only with reference to the accompanying drawings in which:

FIG. 1. is a diagrammatic perspective view of a part of the moving conveyor and the wedge member of an apparatus of the present invention;

FIG. 2. is a plan view of the apparatus;

FIGS. 3, 4 and 5 illustrate in perspective views the manner in which the moving of the conveyor, carrying a half of a pig's head, in relation to the wedge member acts to sever the jowl muscles of the head; and FIG. 6. is a perspective view of the apparatus at the end of one jowl muscle severing operation.

Referring to the accompanying drawings there is provided a metal frame 10 which carries in conventional manner a moving conveyor 11, preferably electrically driven, each section of the conveyor 11 being a stainless steel plate 12. The conveyor 11 is provided with a plurality of spaced apart locating and supporting means consisting of plates 13, 14, 15, 16 welded at right angles to the exposed surface of the conveyor plate 12 and bars 17, 18 which are also fixedly secured to the exposed surface of the conveyor plate 12. The locating and supporting means is adapted to hold securely in position, sideways relative to the direction of motion of the conveyor, a half of a pig's head 19 as illustrated in FIGS. 3, 4, 5 and 6 of the accompanying drawings.

The frame 10 also holds a tubular steel wedge member 20 by means of conventional clamps 21 and 22 which engage respectively the bars 23 and 24 of the said wedge member 20. The pointed end 20a of the wedge member 20 is positioned in a direction directly opposed to the operative direction of travel of the conveyor 11. Further the wedge member 20 is positioned above the conveyor 11 and the wedge member 20 in use passes first between plates 13 and 14 and then between bars 17 and 18. The wedge member 20 comprises a first portion adjacent the forward end 20a which is disposed in a plane substantially normal to the conveyor, and a severing bar 25 which is spaced from the forward end 20a and which is angled rearwardly and sideways relative to the first portion - as illustrated in FIG. 2 of the accompanying drawings.

Adjacent to one end of the conveyor 11 is positioned a table 26 and a steel box post 27 provided with a stainless steel wire loop 28.

In operation a half of a pig's head is held on the post 27 by the wire loop 28 which is tightened around the snout of the half head. The half head in this position is stripped of the outer skin or rind by an operative using a suitable knife.

The skinned half head is then placed on the moving conveyor 11 and held and supported in position by the plates 13, 14, 15 and 16 and bars 17 and 18. It is important that the half head be presented to the wedge member 20 such that the pointed end 20a enter the mouth portion of the half head from the side. As the half head is moved along the wedge member 20 the jaws of the half head are forced apart - the pressures put on the half head are considerable but the plates 13, 14, 15 and 16 and the bars 17 and 18 hold the half head in position. The bar 18 is suitably shaped so that as the upper jaw is forced upward and backward it is supported. When the half head reaches the severing bar 25, the lower jaw is held by the underside of the wedge member 20 and the upper jaw is forced further away from the lower jaw until the jowl muscles are torn or severed. The entire jaw, however, is not severed so that the half head remains in one piece.

The moving conveyor 11 then carries the treated half head beyond the wedge member 20 and it may be removed from the conveyor 11 and further treated in a conventional manner to separate the bone end and head meat.

It will be readily appreciated that the method and apparatus of the present invention greatly speeds up the processing of pig's heads to separate bone, head meat and rind. The method and apparatus used renders the processing hygienic and gives consistent results.

The invention is not limited to the embodiment described above which may be modified and varied without departing from the scope of the invention.

I claim:

1. A method of severing the jowl muscles of a half pig's head, comprising the steps of: placing the half head on a conveyor such that the half head is held securely on the conveyor in a lateral position relative to the direction of conveyance for sideways presentation to a fixed wedge member pointing in the opposite direction to that of the conveyor movement, and advancing the conveyor to drive the wedge member between the upper and lower jaws of the half head from the side and force the jaws progressively further apart to sever the jowl muscles without severing the upper and lower jaws from each other.

2. A method as claimed in claim 1, wherein the outer skin of the half head is removed before it is placed on the conveyor.

3. An apparatus for severing the jowl muscles of a half pig's head, comprising: an endless conveyor, a fixed wedge member mounted above the conveyor and pointing in the opposite direction to that of the conveyor movement, and mounting means for securely locating and supporting a half pig's head sideways on the conveyor in a lateral position relative to the direction of conveyance such that upon movement of the conveyor the fixed wedge member is driven between the upper and lower jaws of the half head from the side and forces the jaws progressively further apart to sever the jowl muscles without severing the upper and lower jaws from each other.

4. An apparatus as claimed in claim 3, wherein the conveyor comprises a series of plates with a respective locating and supporting means fixed to a plurality of the plates.

5. An apparatus as claimed in claim 4, wherein the locating and supporting means comprises a plurality of upstanding members fixed to a plate for locating the lower jaw of a half head, and a supporting member arranged to support the upper jaw of the half head as it is forced upwardly and backwardly away from the lower jaw, the lower jaw being retained in position by the underside of the wedge member.

6. An apparatus as claimed in claims 3 or 5, wherein the wedge member comprises a first portion adjacent the forward end disposed in a plane substantially normal to the conveyor, and a second portion spaced from the forward end and inclined reawardly and sideways relative to the first portion.

* * * * *